(12) United States Patent
Norem et al.

(10) Patent No.: US 9,038,801 B2
(45) Date of Patent: May 26, 2015

(54) CLUTCH WITH PRESSURE SUSTAINING SYSTEM

(75) Inventors: Dean A. Norem, Cherry Valley, IL (US);
Alex Rak, Des Plaines, IL (US);
Timothy P. Walgren, Byron, IL (US);
Raymond N. Weyl, Rockford, IL (US);
Ricky D. Reimers, Rockford, IL (US);
Charles E. Long, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 236 days.

(21) Appl. No.: 13/524,538

(22) Filed: Jun. 15, 2012

(65) Prior Publication Data
US 2013/0334360 A1    Dec. 19, 2013

(51) Int. Cl.
*B64C 27/12*    (2006.01)
*F16D 25/02*    (2006.01)
*F16D 48/02*    (2006.01)
*B64D 35/00*    (2006.01)

(52) U.S. Cl.
CPC ........ *F16D 25/02* (2013.01); *F16D 2048/0218* (2013.01); *B64D 35/00* (2013.01)

(58) Field of Classification Search
CPC ............... F16D 2048/0218; F16D 2048/026
USPC ............................ 192/85.27, 85.28
See application file for complete search history.

(56) References Cited

U.S. PATENT DOCUMENTS

| | | | | |
|---|---|---|---|---|
| 2,893,525 | A * | 7/1959 | McDowall et al. | 192/48.5 |
| 2,960,202 | A * | 11/1960 | Stevens et al. | 192/85.02 |
| 3,833,100 | A * | 9/1974 | Aschauer | 192/85.27 |
| 4,583,626 | A * | 4/1986 | Spridco | 192/70.251 |
| 6,098,921 | A * | 8/2000 | Piasecki | 244/17.19 |
| 7,891,477 | B2 | 2/2011 | Christensen et al. | |
| 2006/0223664 | A1 * | 10/2006 | Duong et al. | 475/159 |
| 2012/0067167 | A1 | 3/2012 | Norem et al. | |
| 2012/0097021 | A1 | 4/2012 | Short et al. | |
| 2012/0114475 | A1 | 5/2012 | Norem | |

* cited by examiner

*Primary Examiner* — Ramya Burgess
*Assistant Examiner* — Mark Manley
(74) *Attorney, Agent, or Firm* — Kinney & Lange, P.A.

(57) ABSTRACT

An assembly includes an output shaft, an input shaft with an internal reservoir, and a clutch. The clutch is adapted to selectively engage and couple the input shaft to the output shaft. The clutch has a pressure chamber that communicates with the reservoir of the input shaft. The reservoir has a sufficient volume to provide the pressure chamber with a fluid pressure adequate to maintain engagement of the clutch during an interruption of a fluid supply to the input shaft and clutch.

20 Claims, 5 Drawing Sheets

US 9,038,801 B2

CLUTCH WITH PRESSURE SUSTAINING SYSTEM

BACKGROUND

The invention relates generally to a gearbox, and more particularly to a gearbox with an input shaft and a clutch adapted to span an interruption in supply fluid to the gearbox.

Clutches are mechanical devices that provide for the transmission of torque and rotational movement from one component (the input driving member) to another (the output driven member) when engaged. Clutches are used when the transmission of torque and rotational movement needs to be controlled. Thus, clutches can be selectively engaged to transfer torque and rotational movement and then disengaged to halt transmission to the driven member.

One gearbox design utilizes a hydraulically actuated clutch with a pressure plate for engaging and holding clutch lock-up for transmission purposes. Hydraulic pressure is applied to the clutch to sustain the clutch engagement.

One criteria for clutch designs in some aerospace applications is that clutch designs cannot permit interruption of positive power transfer during aircraft maneuvers. With a hydraulically actuated clutch design, an interruption in a fluid supply to the clutch can result in clutch disengagement. Fluid supply interruption occurs with a loss of oil intake at supply pumps. This interruption can happen during certain aircraft maneuvers when fluid goes to a top of a supply tank away from the pump intake at a bottom of the tank. Erratic control of the aircraft, damage to the drive line and gears, and plate wear are all possible problematic side effects that can be directly traced to an interruption in the fluid supply to the clutch.

SUMMARY

An assembly includes an output shaft, an input shaft with an internal reservoir, and a clutch. The clutch is adapted to selectively engage and couple the input shaft to the output shaft. The clutch has a pressure chamber that communicates with the reservoir of the input shaft. The reservoir has a sufficient volume to provide the pressure chamber with a fluid pressure adequate to maintain engagement of, and adequate pressure on, the clutch during an interruption of a fluid supply to the input shaft and clutch.

In another aspect, an aircraft includes an airframe and a drive system supported by the airframe. The drive system includes an output shaft, an input shaft with an internal reservoir, and a clutch. The clutch is adapted to selectively engage and couple the input shaft to the output shaft. The clutch has a pressure chamber that communicates with the rotating reservoir of the input shaft. The rotating reservoir has a sufficient volume to provide the pressure chamber with an adequate fluid pressure to maintain engagement of the clutch during an interruption of a fluid supply to the input shaft and clutch.

In yet another aspect, an assembly includes an output shaft, an input shaft with an internal reservoir, and a clutch. The clutch is adapted to selectively engage and couple the input shaft to the output shaft. The clutch has a pressure chamber that communicates with the reservoir of the input shaft via one or more passages. The one or more passages include one or more bleed orifices. The one or more bleed orifices and the reservoir of the shaft are sized to provide the pressure chamber with a fluid pressure adequate to maintain engagement of the clutch during an interruption of a fluid supply to the input shaft and clutch.

DETAILED DESCRIPTION

The present invention provides an input shaft with a cored out interior forming a reservoir for a fluid such as oil to be housed therein. In one embodiment, the fluid is supplied by a lubrication system for an aircraft. A clutch is disposed integral to and rotates along with the input shaft. The clutch is provided with a pressure chamber that receives fluid from the reservoir of the shaft. The hydraulic pressure of the fluid within the pressure chamber causes frictional contact between a plurality of clutch plates to transfer torque from the input shaft to a second (output) shaft during most aircraft operating conditions where it is desirable to have the clutch engaged. However, during some operating maneuvers, (such as when the aircraft performs sudden maneuvers or maneuvers where it is tilted on its side) the flow of fluid from the lubrication system to the reservoir can be temporarily interrupted for a period of time. The duration of this interruption in one application is about 6 seconds or less. During this interruption, pressure is sustained on the clutch plates due to centrifugal pressure of the rotating fluid volumes. The reservoir within the shaft continues to supply the clutch with fluid so a fluid pressure is sustained that is adequate to maintain engagement of the clutch plates. Thus, the reservoir is sized (i.e., has a sufficient volume) to maintain engagement of the clutch during the interruption of fluid supply to the input shaft and clutch. Additionally, the clutch includes one or more bleed orifices that serve to evacuate fluid from the system upon clutch release, thereby relieve pressure and permit disengagement of the clutch plates. The bleed orifices are sized to adequately maintain pressure and engagement of the clutch during normal operation, and to limit bleed rate during an interruption of fluid supply to the input shaft and clutch.

Figure 1:
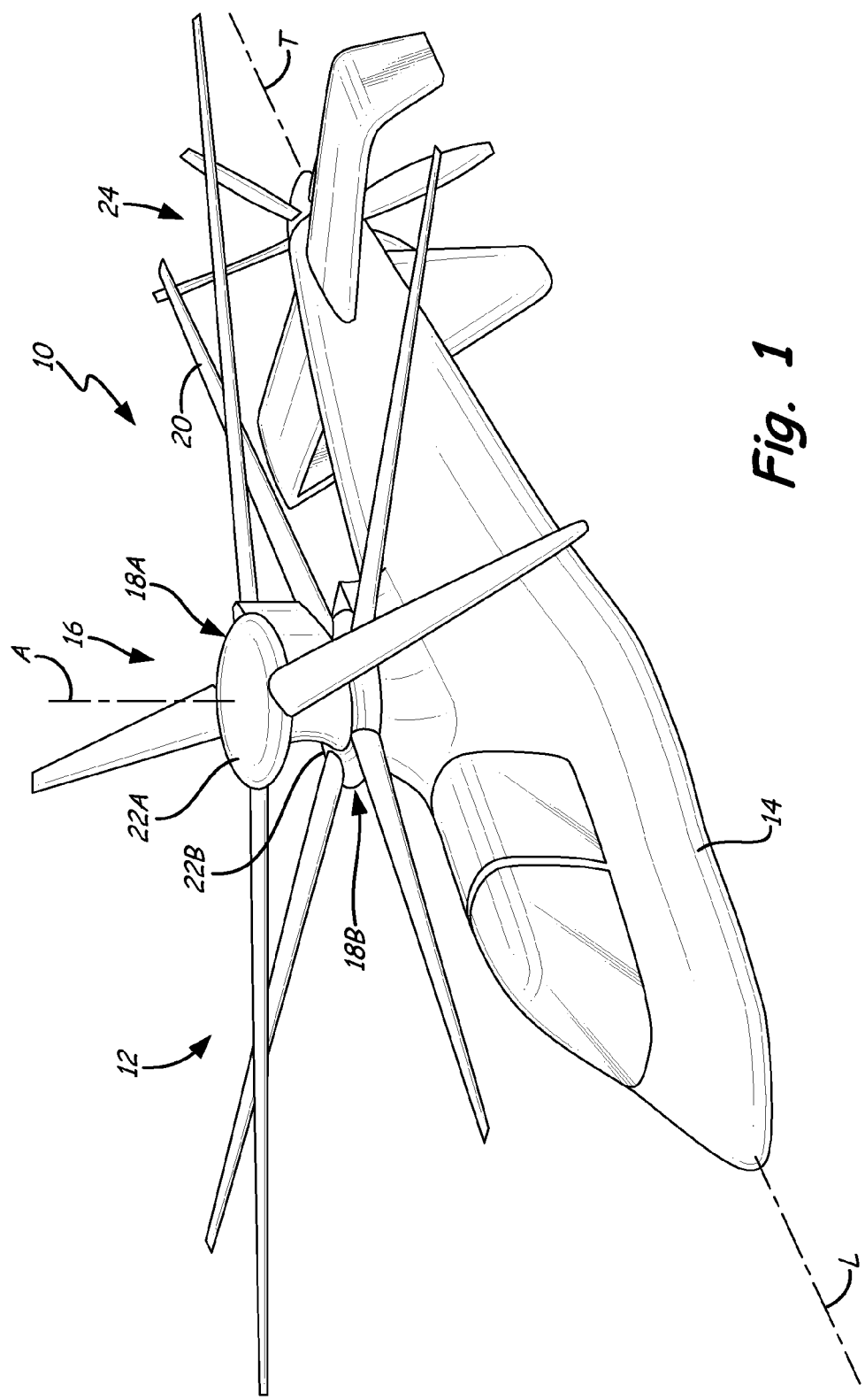
FIG. 1 is a general schematic view of an exemplary rotary wing aircraft embodiment for use with the present disclosure.

FIG. 1 schematically illustrates an exemplary high speed vertical takeoff and landing (VTOL) rotary-wing aircraft 10 including a drive system 12 and an airframe 14. Drive system 12 includes a rotor system 16 with an upper rotor system 18A and a lower rotor system 18B. Each rotor system 18A, 18B includes multiple rotor blades 20 mounted to a respective rotor hub 22A, 22B for rotation about a rotor axis of rotation A. Drive system 12 additionally includes a secondary thrust system 24.

As shown in FIG. 1, drive system 12 is comprised of a counter-rotating, coaxial rotor system 16 which rotates about the axis of rotation A. Aircraft 10 includes airframe 14 that supports drive system 12 and secondary thrust system 24. Secondary thrust system 24 provides secondary thrust generally parallel to an aircraft longitudinal axis L while the main rotor system 12 operates in an unloaded reverse flow state during a high-speed forward flight profile. Although a particular aircraft configuration is illustrated and described in the disclosed embodiment, other configurations and/or machines, such as high speed compound rotary-wing aircraft with supplemental secondary thrust systems, dual contra-rotating, coaxial rotor system aircraft, turbo-props, tilt-rotor, tilt-wing aircraft and non-aircraft applications will also benefit from the shaft and clutch assemblies to be described subsequently. Any number of blades 20 may be used with rotor system 16.

Figure 2:
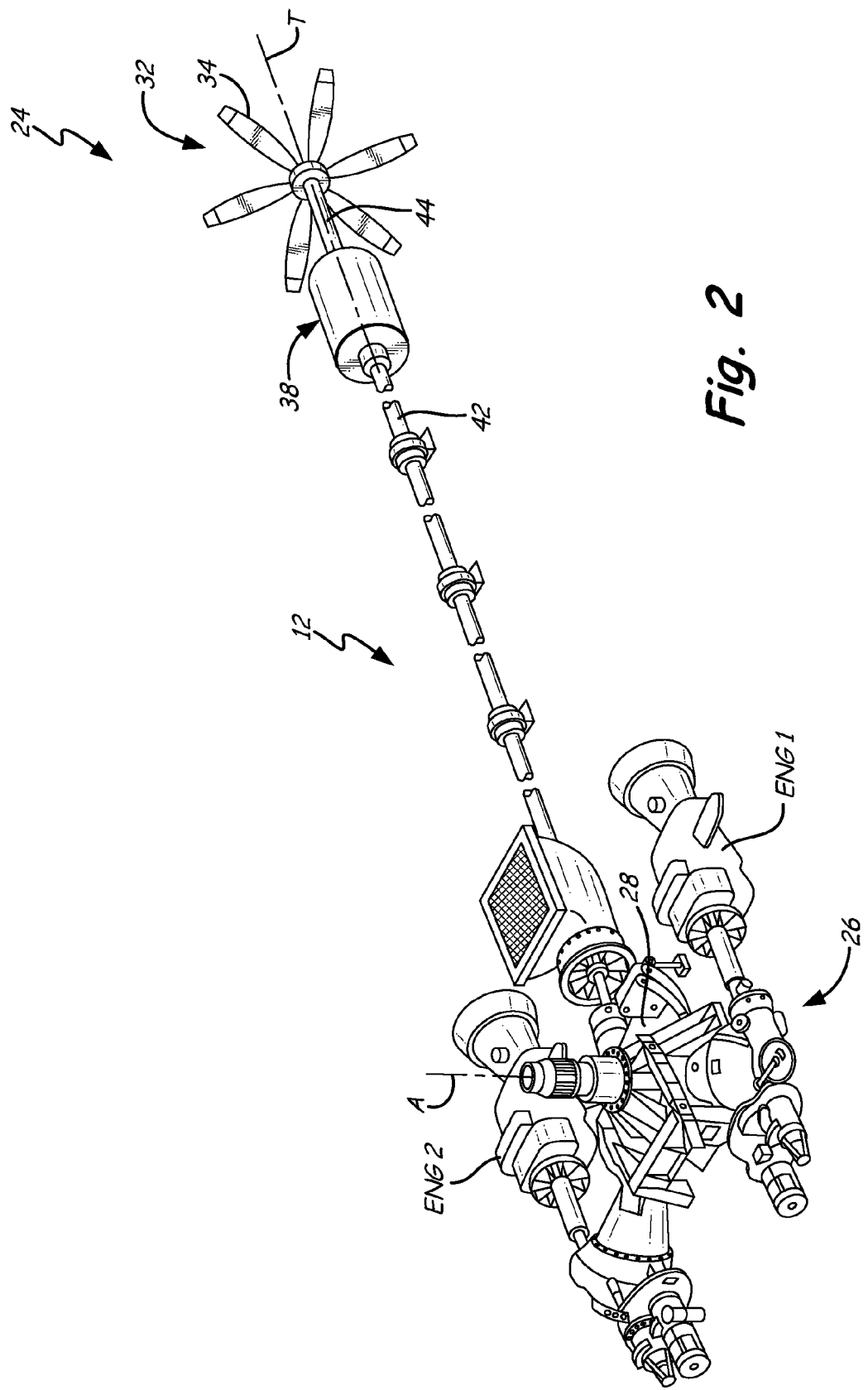
FIG. 2 is a general schematic view of a drive system for the rotary wing aircraft including a gearbox mounted adjacent a tail propeller.

FIG. 2 shows a schematic view of drive system 12 for rotary wing aircraft 10 (FIG. 1). As shown in FIG. 2, drive system 12 further includes a powertrain system 26 and a power plant system 28.

Power train system 26 interconnects power plant system 28 and secondary thrust system 24. Powertrain system 26 may include various gear systems such as main and combiner gearboxes. Power plant system 28 generates the power available for flight operations to power the main rotor system 16 and secondary thrust system 24 through powertrain system 26. Power plant system 28 in the disclosed embodiment includes two engine packages ENG1, ENG2, however, single engine systems as well as multi-engine systems are contemplated with the current invention.

Secondary thrust system 24 in one embodiment may be mounted to the rear of airframe 14 (FIG. 1) transverse to the axis of rotation A with a rotational axis T thereof. As shown secondary thrust system 24, is oriented substantially horizontal and parallel to an aircraft longitudinal axis L to provide thrust for high-speed flight. It should be understood that the configuration of secondary thrust system 24 is purely exemplary and other configurations such as a propeller system mounted to each side of the airframe, a lift fan system, or other systems may be utilized.

In the disclosed, non-limiting embodiment shown in FIG. 2, secondary thrust system 24 includes a pusher propeller system 32 including pusher blades 34. Power is transmitted from an input shaft 42 of drive system 16 through a gearbox 38 to an output shaft 44 to rotationally drive the pusher propeller system 32.

Figure 3:
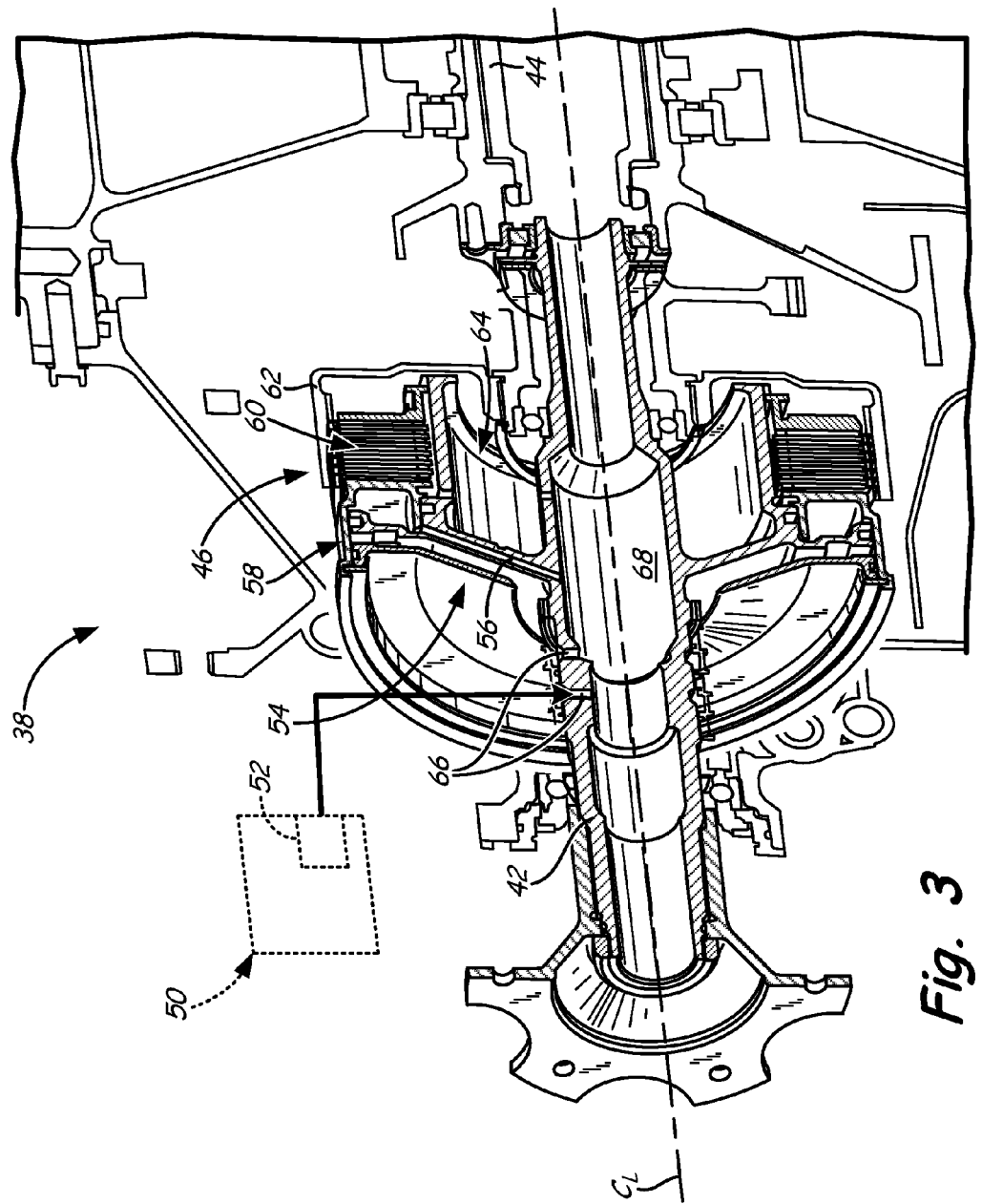
FIG. 3 is perspective view of a cross-section of an input shaft and a clutch according to one embodiment of the invention.

FIG. 3 shows a partial cross-section of gearbox 38, input shaft 42, and output shaft 44. Gearbox 38 includes a clutch 46. A lubrication system 50 including a valve 52 acts to supply and regulate lubricating oil to input shaft 42 and clutch 46. Clutch 46 includes a housing member 54, one or more passages 56, a pressure actuator 58, clutch plates 60, outer shell 62, and plenum 64. Input shaft 42 includes one or more inlet ports 66 and an oil reservoir 68.

Input shaft 42 extends into gearbox 38 and is disposed adjacent to and coaligned with output shaft 44. Clutch 46 is disposed between and is adapted to selectively couple input shaft 42 to output shaft 44. In the embodiment shown in FIG. 3, clutch 46 comprises a rotating transfer coupling that comprises a head cone which extends from and has portions integral with input shaft 42.

Housing member 54 is integral with and extends generally radially from as well as axially along centerline $C_L$, thus has a conical shape. One or more passages 56 extend through the interior of housing member 54 from input shaft 42. Housing member 54 forms the outer casing of pressure actuator 58 which is movable therein. Passages 56 communicate with pressure actuator 58, which is disposed adjacent to and acts to selectively contact clutch plates 60 together.

In one embodiment, clutch plates 60 comprise interposed generally flat steel discs with friction surfaces selectively applied thereto. Alternating rows of clutch plates 60 comprise separating plates which are splined or otherwise connected to input shaft 42 via housing member 54. Interposed between separating plates, friction plates are splined or otherwise connected to output shaft 44 via outer shell 62.

Outer shell 62 extends around the remainder of clutch 46 and ultimately couples to output shaft 44. Together outer shell 62, input shaft 42, and housing member 54 form plenum 64. Thus, plenum 64 is formed between input shaft 42 and clutch 46. In the embodiment shown in FIG. 3, plenum 64 is disposed radially outward of and extends around input shaft 42.

One or more inlet ports 66 allow fluid such as lubricating oil to enter reservoir 68 within input shaft 42. Input shaft 42 and clutch 46 are fed a fluid such as oil by lubrication system 50 of aircraft 10. Fluid is regulated by valve 52 disposed upstream of gearbox 38 and input shaft 42. In one embodiment, valve 52 comprises an electro hydraulic servo valve.

During typical operating conditions for aircraft 10 where it is desired that clutch 46 be engaged, valve 52 is opened and fluid is continuously supplied to reservoir 68 of input shaft 42 by lubrication system 50. From reservoir 68, centrifugal forces move the fluid through passages 56 to be used in pressure actuator 58 to cause engagement of clutch plates 60. Engagement of the clutch plates 60 transfers torque and rotation from input shaft 42 to output shaft 44. The bleed holes means allow fluid to be continuously bleed from clutch 46 into plenum 64 and then scavenged away from gearbox 38.

Interruptions to the flow of fluid to gearbox 38 from lubrication system 50 (or another fluid supply system) can occur. These interruptions generally result when aircraft 10 is tilted or performs certain sudden maneuvers. As a result of these maneuvers, the flow of fluid from lubrication system 50 to reservoir 68 can be temporarily interrupted for a brief period of time. During this time period of interruption, reservoir 68 within input shaft 42 continues to supply clutch 46 with fluid so a fluid pressure is sustained within clutch 46 that is adequate to maintain engagement of clutch plates 60. Thus, reservoir 68 is adequately sized (i.e., has a sufficient volume) to maintain engagement of clutch 46 during the interruption of fluid supply to input shaft 42 and clutch 46.

Figure 4A:
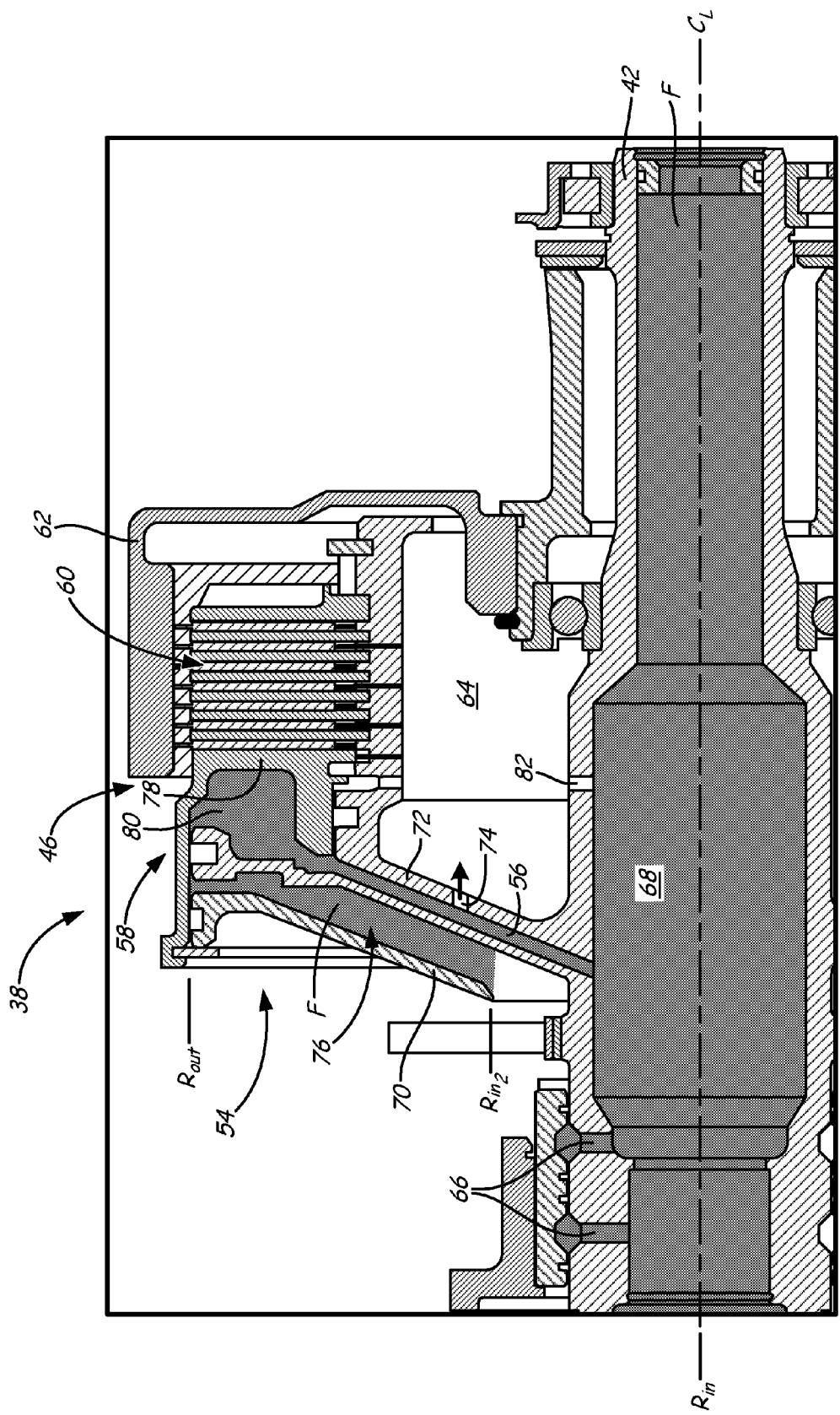
FIG. 4A is an enlarged cross-sectional view of the input shaft and clutch assembly of FIG. 3 depicting a reservoir of the input shaft and portions of the clutch filled with fluid during an engagement condition of the clutch.
Figure 4B:
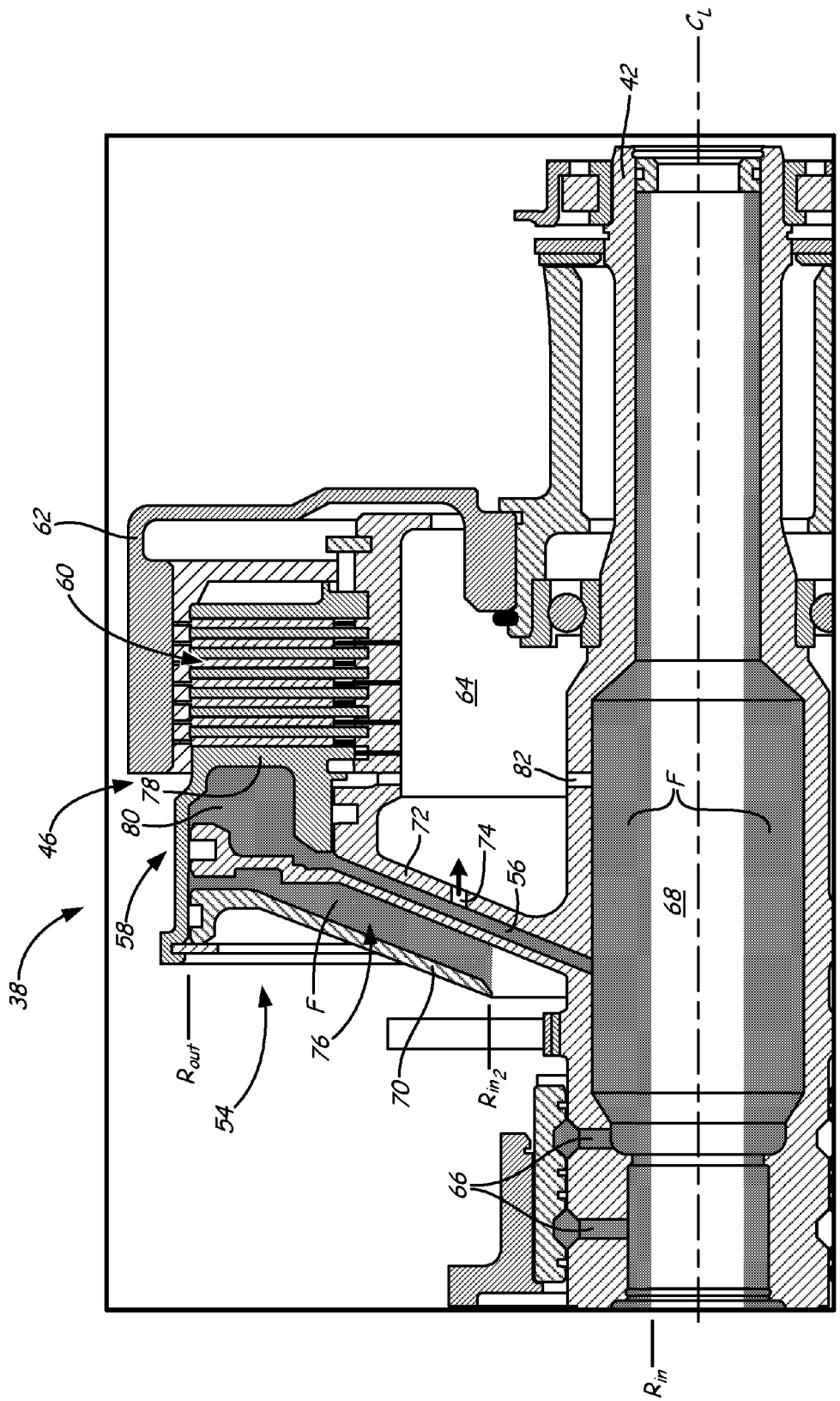
FIG. 4B is an enlarged cross-sectional view of the input shaft and clutch assembly of FIG. 3 depicting the reservoir of the input shaft partially drained of fluid during a lubrication system feed interruption to the input shaft and the clutch.

FIGS. 4A and 4B show an enlarged cross-section of gearbox 38 and input shaft 42. In addition to housing member 54, one or more passages 56, pressure actuator 58, clutch plates 60, outer shell 62, and plenum 64, clutch 46 includes a first wall 70, a second wall 72, one or more bleed orifices 74, a balance pressure chamber 76, a piston 78, and a pressure chamber 80. During clutch-engaged operation, reservoir 68 of input shaft 42 is filled with fluid F such as lubricating oil, as shown in FIG. 4A. Alternately, FIG. 4B shows that system partially drained of fluid, as it may be during an interruption of supply oil. In addition to one or more inlet ports 66 and oil reservoir 68, input shaft 42 includes one or more cooling orifices 82.

In the embodiment shown in FIGS. 4A and 4B, first wall 70 of housing member 54 extends axially and radially outward adjacent input shaft 42. First wall 70 is sealed to and carried with piston 78, and spaced an axial distance from second wall 72. Second wall 72 connects to and comprises a portion of input shaft 42. One or more passages 56 extend through the interior of second wall 72 and are filled with fluid F. One or more bleed orifices 74 extend through second wall 72 and communicate with plenum 64. Balance pressure chamber 76 is formed between first wall 70 and second wall 72. Balance pressure chamber 76 has a fixed radial dimension, setting a constant oil height during rotation, and is open at an inner radial end thereof. The balance pressure chamber 76 has a varying oil volume, based on translation of the piston 78. The balance pressure chamber 76 serves to offset piston 78 and apply pressures and forces upon release of clutch 46.

The outer radial portion of second wall 72 forms a housing in which piston 78 is disposed. Piston 78 is free to linearly translate relative to fixed second wall 72, and abuts with separating plates of clutch plates 60. Piston 78 is sealed to and fixed with first wall 70, and both will translate together. Second wall 72 extends radially outward from input shaft 42 allowing one or more passages 56 to communicate with pressure chamber 80 within piston 78. Pressure chamber 80 has a volume that is variable with linear translation of piston 78. One or more orifices 82 extend through input shaft 42 and communicate with plenum 64. Orifices 82 allow cooling fluid to pass onto clutch plates 60, passing through input shaft 42, and be scavenged away from gearbox 38.

As shown in FIG. 4A, fluid F entirely fills reservoir 68, one or more passages 56 and pressure chamber 80 when clutch 46 is engaged and supply from lubrication system 50 is continuous (i.e., uninterrupted). Balance pressure chamber 76 is filled with fluid F that is maintained within balance pressure chamber 76 by the centrifugal force of rotation of input shaft 42. During the condition shown in FIG. 4A, a pressure differential develops between balance pressure chamber 76 and pressure chamber 80. This pressure differential causes piston 78 to translate and bring clutch plates 60 into contact to couple input shaft 42 with output shaft 44 (FIG. 3). While clutch 46 is engaged, fluid F is continuously bleed from one or more passages 56 through one or more bleed orifices 74 to plenum 64 in order to maintain the centrifugal head pressure at manageable levels.

With regard to the pressure differential between pressure chamber 80 and balance pressure chamber 76, this pressure differential is partially the result of differences between the centrifugal head pressures of the two chambers. For the fluid volume of pressure chamber 80, reservoir 68, and one or more passages 56, the outer radius of the fluid volume $R_{out}$ is defined by piston 78 at the outer radial edge of pressure chamber 80. The inner radius of fluid volume $R_{in}$ is generally coextensive with the centerline axis $C_L$ of input shaft 42. Thus, as centrifugal head pressure is a function of ($R_{out}-R_{in}$), centrifugal head pressure is maximized when reservoir 68, one or more passages 56 and pressure chamber 80 are entirely filled with fluid F. Centrifugal head pressure of balance pressure chamber 76 is smaller because inner radius of that fixed fluid volume $R_{in2}$ is located radially outward of the centerline $C_L$ of input shaft 42. This imbalance of pressures contributes (along with fluid pressure supplied from lubrication system 50) to the linear positioning of piston 78 to engage clutch 46.

As shown in FIG. 4A, during typical operating conditions for aircraft 10 where it is desired that clutch 46 be engaged, fluid is continuously supplied to reservoir 68 of input shaft 42 via inlet ports 66. Fluid F from reservoir 68 passes through one or more passages 56 into pressure chamber 80 and hydraulic pressure within pressure chamber 80 builds. Because ports 66 communicate with lubrication system 50 (FIG. 3), reservoir 68 and pressure chamber 80 eventually reach a fluid pressure that is controlled by valve 52 (FIG. 3). This fluid pressure contributes (along with the difference in centrifugal head pressures between balance pressure chamber 76 and pressure chamber 80) to the linear positioning of piston 78 to engage clutch 46.

Interruptions to the flow of fluid to gearbox 38 from lubrication system 50 (FIG. 3) (or another fluid supply system) can occur. Such an interruption condition is illustrated in FIG. 4B. These interruptions generally result when aircraft 10 is tilted or performs certain sudden maneuvers. As a result of these maneuvers, the flow of fluid from lubrication system 50 to reservoir 68 is temporarily interrupted for a period of time. The duration of interruption is about 6 seconds or less in one application.

During the time period of interruption, reservoir 68 within input shaft 42 begins to empty but continues to supply clutch 46 with fluid F so a fluid pressure is generated that is adequate to maintain engagement of clutch plates 60. Engagement of clutch plates 60 is maintained because the centrifugal head pressure of chamber 80 exceeds the centrifugal head pressure of the balance pressure chamber 76 during the interruption. The outer radius of the fluid volume $R_{out}$ remains the same during the interruption, however the inner radius of fluid volume $R_{in}$ of pressure chamber 80, reservoir 68, and one or more passages 56 decreases but still inside of the inner radius of the fluid volume $R_{in2}$ of balance pressure chamber 76. Thus, $R_{in2}$ is located radially outward of $R_{in}$ in the interrupted fluid condition of FIG. 4B as well as the uninterrupted fluid condition of FIG. 4A. Thus, for a period of time during the interruption (until fluid F reaches a radial distance coextensive with fluid F of balance pressure chamber 76) the centrifugal head pressure of pressure chamber 80, reservoir 68, and one or more passages 56 exceeds the centrifugal head pressure of balance pressure chamber 76. This imbalance of centrifugal head pressures is sufficient to maintain the engagement of clutch 46.

In order to maintain engagement of clutch plates 60 for the duration of the interruption, reservoir 68 and one or more bleed orifices 74 are adequately sized (i.e., have a sufficient volume/diameter) to span the interruption of fluid F supply to input shaft 42 and clutch 46 until flow of fluid F supply can be restored.

In a further embodiment of any of the foregoing embodiments, the assembly and/or aircraft may additionally or alternatively include one or more passages that communicate fluid generally radially outward from the reservoir to the pressure chamber. In a further embodiment of any of the foregoing embodiments, the assembly and/or aircraft may additionally or alternatively include one or more bleed orifices that are sized to provide the pressure chamber with a fluid pressure adequate to maintain engagement of the clutch during the interruption of fluid to the input shaft and clutch. In a further embodiment of any of the foregoing embodiments, the assembly and/or aircraft may additionally or alternatively include a plenum that is formed between the input shaft and the clutch. The plenum communicates with the one or more bleed orifices of the clutch.

In a further embodiment of any of the foregoing embodiments, the assembly and/or aircraft may additionally or alternatively include a planetary gear disposed adjacent the clutch between the input shaft and output shaft. In a further embodiment of any of the foregoing embodiments, the assembly and/or aircraft may additionally or alternatively include a rotating transfer coupling that extends from and has portions integral with the input shaft. In a further embodiment of any of the foregoing embodiments, the assembly and/or aircraft may additionally or alternatively include a piston that linearly moves to vary a size of the pressure chamber in response to changes in fluid pressure. In a further embodiment of any of the foregoing embodiments, the assembly and/or aircraft may additionally or alternatively include that the piston acts as a pressure actuator to contact a plurality of clutch plates together to transfer torque from the input shaft to the output shaft.

In a further embodiment of any of the foregoing embodiments, the assembly and/or aircraft may additionally or alternatively comprise a high speed vertical takeoff and landing (VTOL) rotary-wing aircraft. In a further embodiment of any of the foregoing embodiments, the assembly and/or aircraft may additionally or alternatively include that the drive system comprises a secondary thrust system. In a further embodiment of any of the foregoing embodiments, the assembly and/or aircraft may additionally or alternatively include that the fluid supplied to the input shaft and clutch comes from a lubrication system of the aircraft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly comprising:
an output shaft;
an input shaft having an internal reservoir;
a balance pressure chamber having a first fluid inner radius which is fixed during operation; and
a clutch adapted to selectively engage and couple the input shaft to the output shaft, the clutch comprising:
an actuation pressure chamber that communicates with the reservoir of the input shaft, wherein the actuation pressure chamber has a second fluid inner radius which is variable during operation; and
one or more passages that communicate fluid generally radially outward from the reservoir to the actuation pressure chamber, wherein the one or more passages include one or more axial bleed orifices connecting the one or more passages to a plenum axially overlapping with a plurality of clutch plates and radially between the clutch plates and the reservoir; and
wherein in operation during an interruption of a fluid supply to the input shaft the second fluid inner radius is located radially inward of the first fluid inner radius such that during the interruption of the fluid supply to the input shaft a centrifugal head pressure of the actuation pressure chamber is greater than a centrifugal head pressure of the balance pressure chamber, and wherein the reservoir has a sufficient volume to maintain the second fluid inner radius radially inward of the first fluid inner radius such that the actuation pressure chamber is provided with a fluid pressure adequate to maintain engagement of the clutch-during an interruption of a fluid supply to the input shaft.

2. The assembly of claim 1, wherein the one or more bleed orifices are sized to provide the actuation pressure chamber with a fluid pressure adequate to maintain engagement of the clutch during the interruption of fluid to the input shaft and clutch.

3. The assembly of claim 1, wherein one or more radial orifices connect the plenum to the reservoir.

4. The assembly of claim 1, wherein a duration of interruption is less than about 6 seconds.

5. The assembly of claim 1, wherein the clutch comprises a rotating transfer coupling that extends from and has portions integral with the input shaft.

6. The assembly of claim 1, wherein the clutch includes a piston that linearly moves to vary a size of the actuation pressure chamber in response to changes in fluid pressure.

7. The assembly of claim 6, wherein the piston acts as a pressure actuator to contact the clutch plates together to transfer torque from the input shaft to the output shaft.

8. An aircraft comprising:
an airframe;
a drive system supported by the airframe, wherein the drive system comprises:
an output shaft;
an input shaft having an internal reservoir;
a balance pressure chamber having a first fluid inner radius which is fixed during operation; and
a clutch adapted to selectively engage and couple the input shaft to the output shaft, the clutch comprising:
an actuation pressure chamber that communicates with the reservoir of the input shaft, wherein the actuation pressure chamber has a second fluid inner radius which is variable during operation; and
one or more passages that communicate fluid generally radially outward from the reservoir to the actuation pressure chamber, wherein the one or more passages include one or more axial bleed orifices connecting the one or more passages to a plenum axially overlapping with a plurality of clutch plates and radially between the clutch plates and the reservoir; and
wherein in operation during an interruption of a fluid supply to the input shaft the second fluid inner radius is located radially inward of the first fluid inner radius such that during the interruption of the fluid supply to the input shaft a centrifugal head pressure of the actuation pressure chamber is greater than a centrifugal head pressure of the balance pressure chamber, and wherein the reservoir has a sufficient volume to maintain the second fluid inner radius radially inward of the first fluid inner radius such that the actuation pressure chamber is provided with a fluid pressure adequate to maintain engagement of the clutch during an interruption of a fluid supply to the input shaft.

9. The aircraft of claim 8, wherein the clutch includes one or more passages that communicate fluid from the reservoir to the actuation pressure chamber.

10. The aircraft of claim 9, wherein the one or more passages include one or more bleed orifices, and wherein the one or more bleed orifices are sized to provide the actuation pressure chamber with a fluid pressure adequate to maintain engagement of the clutch during an interruption of fluid to the input shaft and clutch.

11. The aircraft of claim 10, wherein one or more radial orifices connect the plenum to the reservoir.

12. The aircraft of claim 8, wherein the clutch comprises a rotating transfer coupling that extends from and has portions integral with the input shaft.

13. The aircraft of claim 8, wherein the aircraft comprises a high speed vertical takeoff and landing (VTOL) rotary-wing aircraft.

14. The aircraft of claim 8, wherein the drive system comprises a secondary thrust system.

15. The aircraft of claim 8, wherein the fluid supplied to the input shaft and clutch comes from a lubrication system of the aircraft.

16. An assembly comprising:
an output shaft;
an input shaft having an internal reservoir;
a balance pressure chamber having a first fluid inner radius which is fixed during operation; and a clutch adapted to selectively engage and couple the input shaft to the output shaft, the clutch having an actuation pressure chamber that communicates with the reservoir of the input shaft via one or more passages, wherein the one or more passages include one or more axial bleed orifices in fluid communication with a plenum axially overlapping with a plurality of clutch plates and radially between the clutch plates and the reservoir, wherein the actuation pressure chamber has a second fluid inner radius which is variable during operation, wherein in operation during an interruption of a fluid supply to the input shaft the second fluid inner radius is located radially inward of the first fluid inner radius, and wherein the one or more bleed orifices and the reservoir of the shaft are sized to maintain the second fluid inner radius radially inward of the first fluid inner radius such that the actuation pressure chamber has a fluid pressure adequate to maintain engagement of the clutch during the interruption of a fluid supply to the input shaft and clutch.

17. The assembly of claim 16, wherein the clutch comprises a rotating transfer coupling that extends from and has portions integral with the input shaft.

18. The assembly of claim 16, wherein the clutch includes piston slides to vary a size of the actuation pressure chamber in response to changes in fluid pressure.

19. The assembly of claim 18, wherein the piston acts as a pressure actuator to contact the clutch plates together to transfer torque from the input shaft to the output shaft.

20. The assembly of claim 1, wherein the balance pressure chamber is circumferentially open at an inner radial end.

\* \* \* \* \*